June 9, 1964
J. I. MORRISON
3,136,086
LINE RELEASING DEVICE
Filed March 8, 1962
2 Sheets-Sheet 1
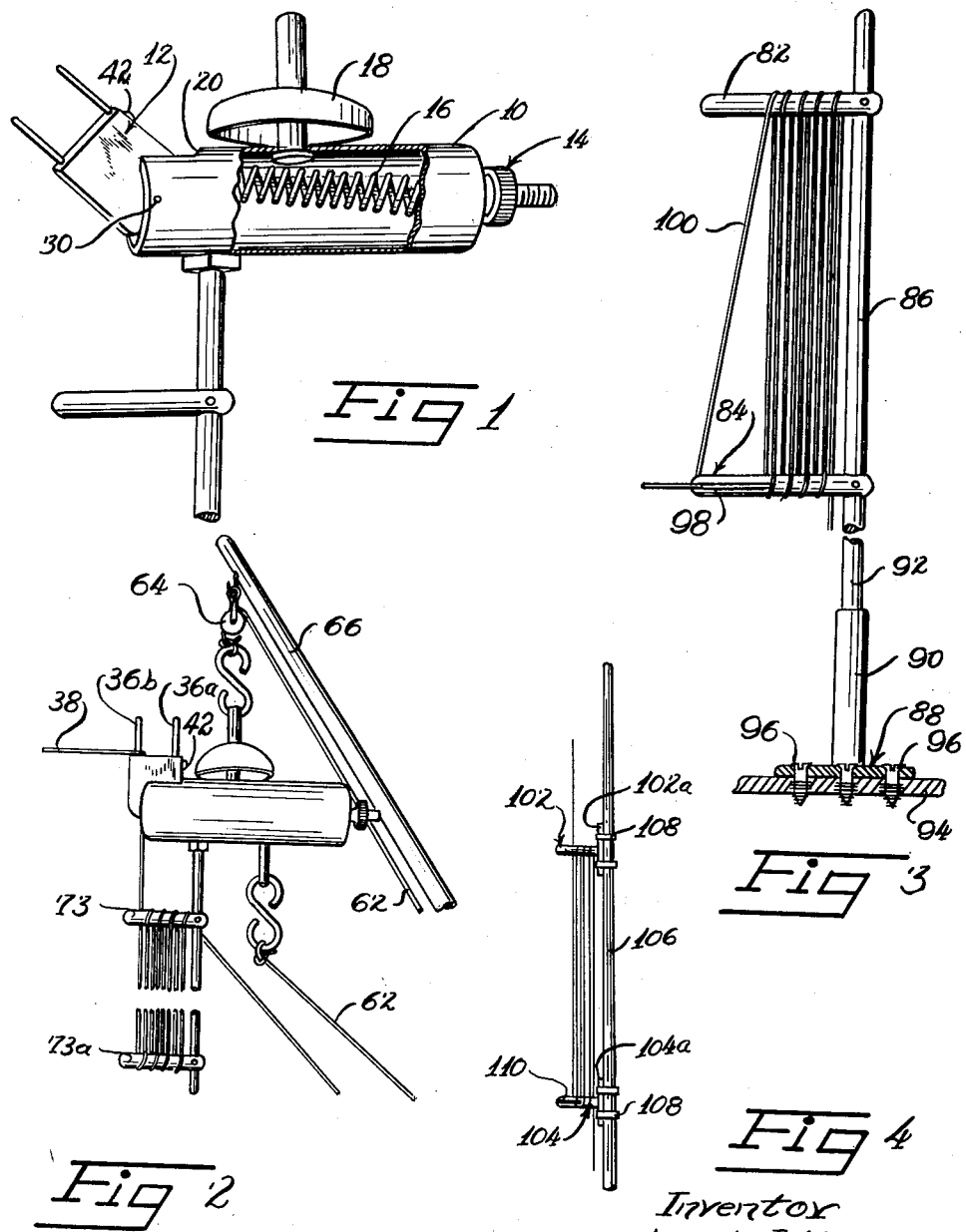

June 9, 1964  J. I. MORRISON  3,136,086
LINE RELEASING DEVICE
Filed March 8, 1962  2 Sheets-Sheet 2
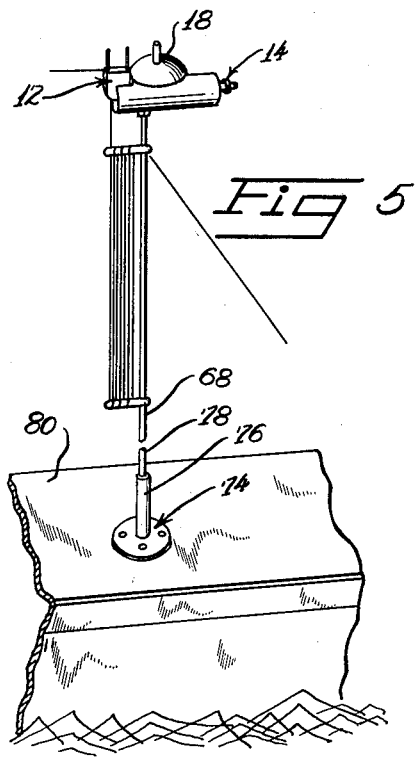
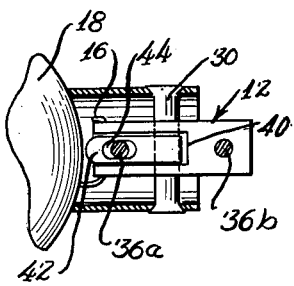
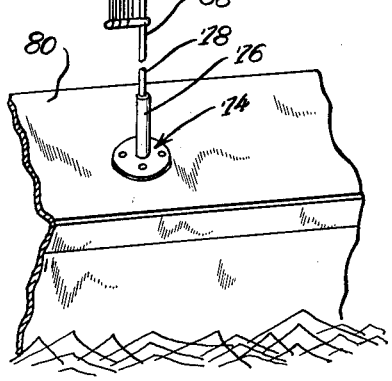
Inventor
Joseph I. Morrison
Grace F. Morrison &
John O. Levinson Coexecutors
BY
Olson, Mecklenburger, von Holst,
Pendleton & Neuman Attys 3,136,086
LINE RELEASING DEVICE
Joseph I. Morrison, deceased, late of Lincolnwood, Ill., by Grace F. Morrison, 4300 W. Montrose Ave., Lincolnwood, Ill., and John O. Levinson, 111 W. Jackson Blvd., Highland Park, Ill., coexecutors
Filed Mar. 8, 1962, Ser. No. 178,504
2 Claims. (Cl. 43—17)

This invention pertains to fishing devices and more particularly to an improved line releasing device for laying out slack in a fishing line.

Various devices have been used to suspend a fishing line from the outer end of an outrigger for deep sea fishing. Most of the devices have been relatively unsatisfactory for a number of reasons, the devices, and the problems with which they have sought to cope, being more completely described in a copending application Serial No. 837,450, now United States Patent No. 3,037,317. The line releasing device in that patent afforded a solution to many of the problems which existed heretofore, prior to the invention therein described; the present invention relates to improvements in the line releasing device described in that patent.

Accordingly, it is one object of the present invention to provide an improved line releasing device which includes a tension adjusting mechanism that is readily accessible to and adjustable by an operator after a fishing line has been engaged upon the device.

Another object of the invention is to provide a line releasing device having a simplified assembly which includes a trigger member motivated by a linearly extended spring member.

Still another object of the invention is to provide a line releasing device having a line storing member, which is disposed to lay out large amounts of line slack without relation to disposition of the device upon an outrigger of a fishing vessel.

Still another object of the invention is to provide a line releasing device having a simplified means for signaling an operator that a strike has been made and that a fishing line has been released from the device.

Other objects and advantages will become more apparent from an examination of the following detailed description taken in conjunction with the accompanying drawings.

According to one embodiment of the invention, there is provided a line releasing device comprising a body member, a trigger member disposed on said body member, a tension adjusting means disposed on said body member in spaced relation to the trigger member, and spring means extended under tension intermediate the trigger member and the tension adjusting means.

Particular reference is made, at this point, to the accompanying drawings in which:

FIGURE 1 is a perspective view of one embodiment of a line releasing device having a portion thereof partially cut away;

FIG. 2 is a perspective view of the line releasing device disposed adjacent an outer extremity of an outrigger and including a line storing member cooperatively associated with the line releasing device;

FIG. 3 is a perspective view, partially in section, of the line storing member which may form a part of the line releasing device;

FIG. 4 is an alternate embodiment of the line storing member;

FIG. 5 is a perspective view of the line releasing device cooperatively associated with the line storing member and disposed upon a deck portion of a fishing vessel;

FIG. 6 is an exploded cross-sectional view of a modification of the line releasing device shown in FIG. 1 taken along a longitudinal dimension of the device; and FIG. 7 is a sectional view of an end portion of the line releasing device taken along line 7—7 of FIG. 6 but showing the several parts in assembled relationship.

Referring more particularly to the drawings, in FIG. 1 one embodiment of the improved line releasing device is shown in a position just releasing a fishing line. The device comprises a body member 10 having a trigger member 12 disposed at one end of the body member and a tension adjusting means 14 disposed at the other end of the body member. A spring 16 extends between the tension adjusting means and the trigger member to pull the trigger member toward a sounding member 18 and a stop means 20 disposed upon the body member adjacent the sounding member.

In the illustrated embodiment the body member 10 is a hollow cylinder or piece of tubing having a cap 22 disposed at one end. The cap is centrally apertured to receive a tension adjusting bar 24. A nut 26, internally threaded to engage cooperatively arranged threads on the tension adjusting bar, includes a face 26a which engages an outwardly facing surface of the cap 22 and bears thereon when the nut is positioned upon tension adjusting bar 24. The bar also includes a spring engaging aperture 28 adjacent an end portion of the bar opposite nut 26 and normally disposed within a tubular internal channel formed by the hollow body member. Thus, the cap, the tension adjusting bar and the nut comprise a tension adjusting means for applying various amounts of tension to the spring 16.

At the other end of the body member, opposite the tensioning adjusting means, trigger member 12 is disposed in pivotal engagement with the body member on an axle 30. In the preferred embodiment the trigger member is formed from a block of aluminum flat stock. An aperture 32 is formed adjacent one end of the block and intermediate side portions thereof to receive axle 30 when the trigger is mounted on the body member. A second aperture 34 is formed in the trigger member in spaced apart relation to the axle-receiving aperture 32, the second aperture being adapted to receive a second end of spring 16 therein. A pair of upright pins 36a and 36b are positioned in one side of the trigger block and are adapted to receive a fishing line 38 wound in releasable engagement thereon. A channel 40 is formed in the trigger member 12, which channel has an orifice disposed in closely spaced apart relation to the sounding member 18. Within the channel 40 a clapper 42 is loosely positioned in such a manner that it may freely move about within the channel when the trigger member is set in motion. An elongated transverse aperture 44 is formed in the clapper having dimensions which will be described hereinafter. In the preferred embodiment pin 36a is so disposed in the trigger member that it extends through the elongated aperture 44 in the clapper to loosely fix the clapper within channel 40.

The trigger is positioned in one end of the body member by mounting it on axle 30 which extends across one end of the tube forming the body member opposite cap 22. One end of the trigger member is partially disposed within the body member tube a sufficient distance away from the wall thereof so that the trigger member may be pivoted in an arc about axle 30. A second portion of the trigger member is disposed within a cutout portion 46 of the body member so that one edge of the trigger member is normally disposed adjacent a stop means 48 formed in the body member by the cutout portion 46. The stop means is disposed in the body member to stop rotation of the trigger member a short distance away from sounding member 18.

The coil spring 16 extends under linearly extended tension between the tension adjusting means and the trigger member to pull the trigger member into abutting engagement with stop means 48. The spring 16 extends through the hollow tubular channel formed by the body member, one end of the spring being hooked into aperture 34 of the trigger member and the opposite end of the spring being hooked into aperture 28 of the tension adjusting bar. Varying degrees of tension are applied to the trigger member by turning nut 26 and varying the extent to which the tension adjusting bar 24 protrudes through cap 22.

The extent of the cutout portion 46 in the body member, in a lengthwise direction of the body member, is determined by the disposition of the sounding member 18 on the body portion and by the disposition of the trigger member and clapper at one end of the body portion. When the trigger member is positioned by the spring member in abutting relationship to the stop means 48 the elongated aperture 44 in the trigger is of sufficient length to permit the clapper to barely extend into striking relationship with sounding member 18. When the trigger member 12 is forcibly rotated about axle 30 away from stop means 48 the tension upon spring member 16 is increased to urge the trigger member back toward the stop means; when the trigger member is released the spring 16 urges it to rotate about axle 30 back to the stop means 48, where the motion of the trigger member is abruptly halted. Centrifugal force, however, causes a clapper to be thrown into striking engagement against the sounding member. The extent of elongated transverse aperture 44 restricts movement of the clapper within channel 40 so that the clapper merely strikes a resounding blow upon the sounding member but does not rest thereupon to inhibit resonance of the sounding member.

The body member may be mounted upon a deck, as shown in FIG. 5 (see also FIG. 1) or suspended from an outrigger or pole, as shown in FIG. 2; in the latter case the body member may be provided with upper and lower pivotally mounted and externally threaded studs 50 and 50a. In the embodiment illustrated in FIG. 6 studs 50 and 50a are simply inserted through apertures drilled into the tubular body member so that externally threaded portions of the studs extend outwardly from the body member. A pair of internally threaded caps 52 and 52a are screwed down tightly upon the externally threaded portions of the studs; each cap is backed away from its tight engagement for a short distance, approximately a quarter of a turn. The studs and caps are then drilled to provide cooperating apertures 54 and 56, and 54a and 56a, into which cotter pins 58 and 58a are inserted, thus providing upper and lower pivotal engagement members on the body portion which may be freely rotated 360°. Clips 60 and 60a are engaged in the caps 52 and 52a, respectively, to permit the line releasing device to be fastened into an outrigger line and positioned at the outer end of the outrigger on a fishing vessel.

This position of the line releasing device on the outer portion of an outrigger is illustrated in FIG. 2 of the drawings. A line 62 is disposed through a pulley 64 attached to the outer end of the outrigger 66. Line 62, after being tied to clips 60 and 60a attached to the line releasing device, may be pulled through the pulley to dispose the line releasing device at any intermediate point between the outer end of outrigger 66 and the fishing vessel.

The line releasing device heretofore described is also arranged to cooperatively accommodate a line storing member on body portion 10. A straight rod 68 is inserted into an aperture adjacent the trigger member on the body portion and is positioned to hang below the body portion. A pin 70 is inserted into an aperture in a portion of rod 68 which extends into the tubular channel of body portion 10. After pin 70 is inserted in the rod, inside the body portion, a nut 72 which is normally disposed on the rod is tightened up against the outside of the body portion to hold the rod in firm engagement with the body portion.

The rod 68 extends below the body portion for any desirable length. Two smooth, line-storing pins 73 and 73a are fastened to rod 68 a short distance below the body portion 10, both pins being disposed in parallel relationship to each other and substantially parallel also to the length of the body portion. Both pins extend from the rod in the direction in which trigger member 12 rotates away from stop means 48.

In this disposition of the line storing member and the trigger member a finishing line, as shown in FIG. 2, may be wrapped around the spaced apart pins 73 and 73a much in the manner of a bobbin. After a desired amount of fishing line is wound upon the storing pins, the line is led twice around pin 36b of the trigger member, the line being pulled fairly taut as it extends from pins 73 and 73a to the trigger member. In such assembly the fishing line 38 is retained on the line storing member until the trigger member is tripped by the strike of a fish, and then the total amount of line stored is released as a result of action of the trigger member.

Various modifications of the assembly just described may be made. For example, as shown in FIG. 5, a standard 74 may be provided, having a socket portion 76 into which an extended portion 78 of rod 68 is engaged so that the line releasing device may be mounted upon a deck 80 of a fishing vessel. Standard 74 may also be mounted upon a flat surface of a bridge or of a diving platform floating out in a body of water. This modification largely dispenses with the use of outriggers, one of the particular purposes of which is to provide a substantial length of line to be laid out, i.e. "dropped back," behind a fishing vessel when a strike occurs. This modification also requires substantially less space and entails substantially less expense for equipment than outriggers.

The line storing member is itself suited to different modifications. As shown in FIG. 3, a pair of parallel substantially smooth pins 82 and 84 are affixed to an interconnecting rod 86. A standard 88 is provided with a socket portion 90 into which an extended portion 92 of the rod is adapted to fit. The standard is affixed to a deck 94 by suitable means such as screws 96. Lower pin 84 is provided with an open slotted end 98, the slotted end being adapted to receive a portion of the last turn of a fishing line 100 wound about pins 82 and 84. When so arranged the line storing member is usable with any line releasing device which may be considered desirable by the operator. The slotted end 98 of lower pin 84 provides a means for retaining the line 100 on the pins until the line releasing device is tripped by a strike, whereupon the stored amount of line is laid out.

It may be desirable, under different conditions, to vary the distance between pins on the line storing member. A modification which permits such variation is shown in FIG. 4. Upper and lower pins 102 and 104, respectively, are separate parts generally formed in the shape of a T. Base portions 102a and 104a are formed for cooperative engagement upon an interconnecting rod 106, base portions 102a and 104a being curved in cross section if rod 106 should be round, for example, or having a flat portion if rod 106 should be square. Suitable tying means may be provided such as, for example, bands 108, or sheet metal screws (not shown) to attach base portions 102a and 104a to the rod. Depending upon the line releasing device used, pin 104 may be provided with a slotted end portion 110. The combination shown in FIG. 4 permits a great amount of discretion in the amount of line stored and in the type of line used, since it may be desirable to space the pins farther apart if a heavier weight of line is used and closer together if a lighter weight of line (having a smaller diameter) is used.

The purpose and use of the line releasing device is as follows: the device, adapted to be disposed at the outer end of an outrigger on a fishing vessel, is attached to a positioning means on the outrigger. A fishing line from the end of a rod is led to the line releasing device, an estimated amount of tension is set on the tension adjusting means of the device, and a substantial amount of slack is put into the line intermediate the fishing rod and the device. From the releasing device the line is dropped into the water and trailed behind the fishing vessel, a hook on the end of the line being provided having a suitable bait for the type of fish desired. When a fish strikes the bait the force of the strike on the line trips the line releasing device, which initiates laying out the line slack previously provided in order to allow the bait to lie still in the water as prey of the fish making the strike would normally do.

In the present invention, when the fishing line is led to the line releasing device and wound around one or both of the pins 36a and 36b, an appropriate amount of tension is applied to the trigger member, depending upon, with the conditions prevailing at the time; such conditions may include the direction of the current, the roughness of the sea and the size of the bait used.

The amount of tension is adjusted by turning nut 26 to position the tension adjusting bar 24 in appropriate spaced relationship to the trigger member, the latter normally being held in upright position intermediate axle 30 and stop means 48 by the tension exerted through spring 16. One advantage of the present invention is that tension may be adjusted on the line releasing device after the fishing line is wound upon one or both of pins 36a and 36b without risking any movement of the trigger member and corresponding possibility of disengaging the line accidentally. Another advantage of the present invention is the accuracy with which the amount of tension on the trigger member may be gauged, there being no portion of the spring member which might impinge upon another portion of the spring to provide frictional forces which would otherwise have to be taken into consideration.

It may be desirable, again depending upon the conditions prevailing at the time, to provide more slack than can conveniently be let out between the line releasing device and the end of the fishing rod. In such case the fishing line may be led directly from the end of the fishing rod to the line storing member on the line releasing device just described. A desirable amount of slack may then be wound upon the line storing member before engagement of the line upon the trigger member. When so arranged the present line releasing device is adapted to lay out a large amount of slack behind the fishing vessel, without regard to the length of the outrigger, whenever a strike occurs.

Depending upon the size and arrangement of the fishing vessel it may be desirable to eliminate the constructional features which attend the use of outriggers. In such cases, the line releasing device may be mounted in a standard affixed to a deck portion of the fishing vessel, and the same result as that obtained by using outriggers will be effected; however, although the same engagement of the fishing line on the line releasing device is made as when outriggers are used, the use of a drop back storing member is desirable.

Whether the line releasing device is used on an outrigger or used with a standard affixed to the deck of a fishing vessel, the cooperation of the sounding member and the clapper will provide an audible signal to attract the attention of the fisherman when a strike has been made. Since it is often desirable to use more than one setup, an arrangement of several fishing lines may be operated by a fisherman who must be notified quickly that a strike has been made on a particular line. The audible signal provided by the sounding member and clapper provides a readily identifiable means for indicating a particular fishing line which has become active.

While a particular embodiment of this invention has been illustrated and described, it will be understood that the invention is not to be limited thereto since many modifications may be made, and it is contemplated therefore by the appended claims to cover any such modifications as fall within the true spirit and scope of this invention.

I claim:

1. A line releasing device comprising a body member having a channel disposed therein intermediate opposite end portions thereof, an abutment in said body member upon a wall thereof adjacent one of said end portions, said abutment being formed by an edge of said wall at the bottom of a U-shaped cutout portion in said wall, a trigger member rotatably disposed on said body member against said abutment, a tension adjusting means on said body member in spaced relation to said trigger member, spring means extended under tension intermediate said trigger member and said tension adjusting means and disposed through said channel to urge rotation of said trigger member toward said tension adjusting means and against said abutment, and a sounding member disposed on said body member adjacent said trigger member and said abutment, said trigger member having a clapper movably disposed therein for striking said sounding member.

2. A line releasing device comprising a body member having a channel disposed therein intermediate opposite end portions thereof, an abutment in said body member upon a wall thereof adjacent one of said end portions, said abutment being formed by an edge of said wall at the bottom of a U-shaped cutout portion in said wall, a trigger member rotatably disposed on said body member against said abutment, a tension adjusting means on said body member in spaced relation to said trigger member, spring means extended under tension intermediate said trigger member and said tension adjusting means and disposed through said body member channel to urge rotation of said trigger member toward said tension adjusting means and against said abutment, and a sounding member disposed on said body member adjacent said trigger member and said abutment, said trigger member having a channel therein with an orifice adjacent said sounding member, said trigger member also having a clapper disposed in said trigger member channel and movable through said orifice into striking engagement upon said sounding member as said trigger member is rotated sharply against said abutment, and said trigger member also having a clapper retaining member extending into said trigger member channel for maintaining said clapper loosely therein.

References Cited in the file of this patent
UNITED STATES PATENTS

| Number | Name | Date |
|---|---|---|
| 284,032 | Marett | Aug. 28, 1883 |
| 1,815,662 | Bacon | July 21, 1931 |
| 2,548,351 | Coombs | Apr. 10, 1951 |
| 2,654,338 | Deal | Oct. 6, 1953 |
| 2,730,830 | Smith | Jan. 17, 1956 |
| 2,864,199 | Vollten | Dec. 16, 1958 |
| 2,973,599 | Olson | Mar. 7, 1961 |
| 2,995,853 | Ohliger | Aug. 15, 1961 |
| 2,995,854 | Dixon | Aug. 15, 1961 |
| 3,012,353 | Leech | Dec. 12, 1961 |